United States Patent
Owen et al.

(10) Patent No.: US 11,994,079 B2
(45) Date of Patent: *May 28, 2024

(54) SPLIT CYCLE ENGINE CONTROL

(71) Applicant: Dolphin N2 Limited, Sussex (GB)

(72) Inventors: Nick Owen, Sussex (GB); Andrew Atkins, Sussex (GB); Anoop Selvaraj, Sussex (GB)

(73) Assignee: DOLPHIN N2 LIMITED, Sussex (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/210,871

(22) Filed: Jun. 16, 2023

(65) Prior Publication Data

US 2023/0332552 A1 Oct. 19, 2023

Related U.S. Application Data

(63) Continuation of application No. 17/433,742, filed as application No. PCT/GB2020/050448 on Feb. 25, 2020, now Pat. No. 11,719,177.

(30) Foreign Application Priority Data

Feb. 26, 2019 (GB) ...................... 1902593

(51) Int. Cl.
*F02D 41/22* (2006.01)
*F02D 13/02* (2006.01)
(Continued)

(52) U.S. Cl.
CPC ....... *F02D 41/021* (2013.01); *F02D 13/0215* (2013.01); *F02D 41/401* (2013.01);
(Continued)

(58) Field of Classification Search
CPC .. F02D 41/021; F02D 41/401; F02D 41/0025; F02D 41/22; F02D 41/064;
(Continued)

(56) References Cited

U.S. PATENT DOCUMENTS

| 6,276,334 B1 | 8/2001 | Flynn et al. |
| 8,662,030 B2 | 3/2014 | Jackson et al. |

(Continued)

FOREIGN PATENT DOCUMENTS

| GB | 2535693 | 8/2016 |
| GB | 2560949 | 10/2018 |

(Continued)

OTHER PUBLICATIONS

Chinese Office Action dated Mar. 1, 2023 issued in corresponding Chinese Application No. 202080031687.9, with machine translation to English.

(Continued)

*Primary Examiner* — Hai H Huynh
(74) *Attorney, Agent, or Firm* — Onello & Mello, LLP

(57) ABSTRACT

The split cycle engine of the present disclosure comprises a compression cylinder (10) accommodating a compression piston (12), a combustion cylinder (20) accommodating a combustion piston (22), a recuperator (35) arranged to exchange heat between exhaust fluid (95) from the combustion cylinder and working fluid being supplied from the compression cylinder to the combustion cylinder via a crossover passage (30). A controller is configured to control operation of the engine based on an indication of a temperature of at least one of a material of the recuperator and the working fluid in the crossover passage.

20 Claims, 2 Drawing Sheets

(51) Int. Cl.
  *F02D 41/02* (2006.01)
  *F02D 41/40* (2006.01)
  *F02B 33/22* (2006.01)

(52) U.S. Cl.
  CPC ........ *F02B 33/22* (2013.01); *F02D 2200/021* (2013.01); *F02D 2200/023* (2013.01)

(58) Field of Classification Search
  CPC ............. F02D 41/0007; F02D 13/0215; F02D 2200/021; F02D 2200/023; F02D 19/12; F02D 2400/00; F02D 35/025; F02D 37/00; F02D 2041/001; F02B 33/22; F02B 33/44; F02B 33/06; F02B 37/18; F02B 29/04; Y02T 10/12; Y02T 10/40
  USPC .................. 123/66, 68, 70 R, 58.8, 317, 318
  See application file for complete search history.

(56) References Cited

U.S. PATENT DOCUMENTS

| | | |
|---|---|---|
| 10,240,520 B2 | 3/2019 | Jackson |
| 11,092,066 B2 | 8/2021 | Atkins et al. |
| 11,391,198 B2 | 7/2022 | Morgan et al. |
| 11,428,151 B2 | 8/2022 | Osborne et al. |
| 2012/0103314 A1 | 5/2012 | Jackson et al. |
| 2018/0023465 A1 | 1/2018 | Jackson |
| 2019/0368415 A1 | 12/2019 | Morgan et al. |
| 2020/0049058 A1 | 2/2020 | Atkins et al. |

FOREIGN PATENT DOCUMENTS

| | | |
|---|---|---|
| GB | 2565050 | 2/2019 |
| GB | 2565216 | 2/2019 |
| JP | 5932135 | 2/1984 |
| JP | 63120821 | 5/1988 |
| JP | 0365216 | 3/1991 |
| JP | 11323432 | 11/1999 |
| WO | 2010067080 | 6/2010 |
| WO | 2016025562 | 2/2016 |
| WO | 2018178624 | 10/2018 |
| WO | 2019020978 | 1/2019 |

OTHER PUBLICATIONS

Combined Search and Examination Report dated Aug. 13, 2019 issued in corresponding Great Britain Application No. 1902593.1.

International Search Report and Written Opinion dated Jul. 16, 2020 issued in corresponding International Application No. PCT/GB2020/050448.

Japanese Office Action dated Nov. 29, 2023 issued in Japanese Application No. 202155090, with English translation.

SPLIT CYCLE ENGINE CONTROL

RELATED APPLICATIONS

The present application is a continuation application of U.S. patent application Ser. No. 17/433,742, filed Aug. 25, 2021, which is a 371 national stage application of Patent Cooperation Treaty Application No. PCT/GB2020/050448 filed Feb. 25, 2020, entitled "SPLIT CYCLE ENGINE CONTROL", which in turn claims priority under 35 USC 119(e) to British Patent Application No. 1902593.1, filed Feb. 26, 2019, each of which is incorporated herein by reference.

TECHNICAL FIELD

The present disclosure relates to the field of split cycle engines. In particular, aspects of the disclosure relate to the field of temperature control within a split cycle engine.

BACKGROUND

GB 2565050 discloses a split cycle engine having a compression cylinder for compressing working fluid and a combustion cylinder for combusting working fluid. The engine supplies working fluid from the compression cylinder to the combustion cylinder via a crossover passage. The engine also includes a controller which is arranged to determine a peak temperature of combustion in the combustion cylinder and to control operation of the engine based on this peak temperature of combustion. For instance, the controller may control operation of the engine by controlling at least one of the following: operation of a coolant system, timings of inlet valve opening and closing for fluid flow into the combustion cylinder, and a position in the cycle at which fuel is injected into the combustion cylinder. The controller is configured to control such operations to keep the peak temperature below a threshold value, for example within a selected temperature range.

Aspects of the present disclosure seek to control other temperatures associated with the engine and/or to provide different systems and methods for controlling a peak temperature of combustion in the combustion cylinder.

SUMMARY

Aspects of the disclosure are set out in the independent claims and optional features are set out in the dependent claims. Aspects of the invention may be provided in conjunction with each other, and features of one aspect may be applied to other aspects.

In an aspect, there is disclosed a split cycle internal combustion engine comprising: (i) a compression cylinder accommodating a compression piston, (ii) a combustion cylinder accommodating a combustion piston, (iii) a recuperator arranged to exchange heat between exhaust fluid from the combustion cylinder and working fluid being supplied from the compression cylinder to the combustion cylinder via a crossover passage, and (iv) a controller configured to control operation of the engine based on an indication of a temperature of at least one of (i) a material of the recuperator and (ii) the working fluid in the crossover passage. As described in more detail below, the indication of a temperature of a material of the recuperator may for example be inferred from operation conditions relevant to the recuperator (for example, based on an indication of temperature of working fluid exiting the combustion cylinder and/or an indication of temperature of working fluid in the crossover passage), or may be directly sensed, for example from the recuperator itself, or a part thereof.

Embodiments of the present disclosure may enable the prevention of heat-induced material defects associated with operation of the engine. For example, material of the recuperator may suffer from thermal creep as a consequence of being exposed to high temperatures during operation of the engine. Through control of the operation of the engine, the temperatures in the recuperator may be controlled so as to reduce an amount of heat-induced damage inflicted on the recuperator.

The temperature of the material of the recuperator may be a peak temperature in the material of the recuperator. The peak temperature may be experienced in the recuperator at the point of entry of the exhaust working fluid entering the recuperator from the combustion cylinder. Controlling operation of the engine based on the indicated temperature may comprise controlling operation of the engine so that the temperature of the engine, or at least a portion of the engine such as the recuperator, lies within a selected range. The controller may control operation of at least one component of the engine so that continued use of the engine (with the modified operation of said component) drives the temperature of at least a portion of the engine, such as the recuperator temperature, towards the selected range.

Controlling operation of the engine based on the indication of the temperature of at least one of (i) the material of the recuperator and (ii) the working fluid in the crossover passage may comprise: in the event that the indicated temperature exceeds an upper threshold value, controlling operation of the engine to reduce the temperature of at least a portion of the engine, such as the material of the recuperator. The controller may control operation of the engine to reduce the temperature of at least a portion of the engine, such as the material of the recuperator, by controlling operation of the engine to reduce a temperature of at least one fluid passing through the portion of the engine, such as the recuperator, e.g. to reduce a temperature of the exhaust fluid from the combustion cylinder and/or to reduce a temperature of the working fluid passing through the recuperator from the compression cylinder to the combustion cylinder. For example, this may comprise controlling the operation of the engine so that the temperature of the exhaust fluid at the point that it is passing through the recuperator is lower than the upper threshold value. This may reduce the occurrence of (or the number of occurrences of) peak temperatures in the material of the recuperator exceeding a threshold value associated with damaging the material of the recuperator.

The upper threshold value may be selected based on a temperature associated with material damage to the portion of the engine, for example associated with material damage to the recuperator. The upper threshold value may be selected based on a material of the recuperator. For example, the upper threshold value may be approximately 800 degrees Celsius. The material may be Inconel and the upper threshold value may be 800 degrees Celsius. It will be understood that the threshold value may be a function of pressure, for example a pressure of working fluid in the recuperator. The temperature associated with material damage may be a temperature associated with heat-induced thermal creep issues with the material.

Controlling operation of the engine based on the indication of the temperature of at least one of (i) the material in the recuperator and (ii) the working fluid in the crossover passage may comprise: in the event that the indicated temperature is below a lower threshold value, controlling operation of the engine to increase the temperature of at least a portion of the engine, such as the material of the recuperator. For example, this may be to increase the temperature of working fluid in the recuperator, e.g. for either fluid passing through the recuperator. The controller may control operation of the engine to increase the temperature of at least a portion of the engine, such as the material of the recuperator by controlling operation of the engine to increase a temperature of at least one fluid passing through the portion of the engine, such as the recuperator, e.g. to increase a temperature of the exhaust fluid from the combustion cylinder and/or to increase a temperature of the working fluid passing through the recuperator from the compression cylinder to the combustion cylinder. For example, this may comprise controlling operation of the engine so that the temperature of the exhaust fluid at the point that it is passing through the recuperator is higher than the lower threshold value. This may reduce a length of time during which recuperator (and thus working fluid) temperatures are sufficiently low so as to impede combustion levels for the fluid.

The recuperator may comprise: (i) a first passage for fluid travelling from the compression cylinder to the combustion cylinder, and (ii) a second passage for exhaust fluid travelling from an exhaust of the combustion cylinder. The recuperator is arranged so that in use the hotter exhaust fluid may transfer heat to the cooler working fluid prior to their injection into the combustion cylinder. The second passage is arranged to receive hotter fluids than the first passage. The recuperator may be arranged to provide heat transfer from the second passage to the first passage, e.g. from fluids in the second passage to fluids in the first passage. A temperature of a material of the recuperator may comprise a peak temperature of any material in the recuperator. It may comprise an average recuperator temperature and/or a temperature indicative of the hotter side of the recuperator (e.g. the second passage). It may comprise an average of the two fluid temperatures or an indication of one of the two fluid temperatures. The temperature (and any threshold temperatures) may be pressure-dependent (e.g. so that their value may change depending on the current pressure).

The engine may comprise a turbine arranged to be driven by exhaust fluid flowing from the combustion cylinder to the recuperator. Driving the turbine using the exhaust fluid may provide a reduction in the temperature of the exhaust fluid. In turn, this may provide a reduction in the temperature of the exhaust fluid flowing through the recuperator and thus may provide a reduction in the temperature of the material of the recuperator. The controller may be configured to control operation of the engine based on the indicated temperature by controlling operation of the turbine to regulate a temperature of the exhaust fluid from the combustion cylinder. Controlling operation of the turbine may comprise controlling a degree of resistance imparted by the turbine to the exhaust fluid flowing past the turbine. For example, the proportion of the fluid's flow path that is obstructed by the turbine may be varied, and/or the turbine may be connected to a variable gear system.

The turbine may be coupled to a compressor arranged for compressing inlet fluid to be supplied to the compression cylinder. The compressor may be a turbocharger. The compressor may increase the pressure and density of working fluid supplied to the compression cylinder, so that there is more mass of working fluid moving through the engine. This use of a compressor may provide increased power output, and higher operating temperatures of the engine. This may provide increased temperature in the recuperator as a consequence of the increased operating temperatures. The turbine may however have a cooling effect, as the thermal energy of exhaust fluid is reduced before arriving at the recuperator, due to the interaction of the exhaust fluid with the turbine. The turbine may be coupled to other means, such as a power generator e.g. a turbo-generator, to harvest power from the flow of the exhaust fluid. Such harvested power may be stored e.g. in an electrical storage means and/or provided to an e-supercharger.

The engine may comprise a turbine bypass passage arranged to enable at least some of the exhaust fluid from the combustion cylinder to flow to the recuperator without driving the turbine. A turbine bypass valve may be provided for controlling the volume of fluid which may flow through the turbine bypass passage—it may move between a first position in which no fluid may flow through the turbine bypass passage and a second position in which as much fluid may flow through the turbine bypass passage as is practically possible. The controller may be configured to control operation of the engine based on the indicated temperature by controlling use of the turbine bypass passage. For example, in the event that the indicated temperature is above the upper threshold, the controller may restrict the volume of fluid which may flow through the bypass passage so that more fluid has to flow past the turbine (e.g. to cool it down). In the event that the indicated temperature is below the lower threshold, the controller may increase the volume of fluid which may flow through the bypass passage so that less fluid has to flow past the turbine (e.g. so that the exhaust fluid arrives hotter at the recuperator—to warm it up). The controller may control use of the turbine bypass passage so that a temperature of the recuperator is in a selected range. The turbine bypass passage may comprise a wastegate for the turbine. In some examples the turbine may comprise a variable-geometry turbine, for example comprising guide vanes of variable pitch. In some examples the controller may be configured to control the pitch of the guide vanes, for example to control the temperature of the engine.

The engine may comprise a recuperator bypass passage arranged to enable at least some fluid to avoid flowing through the recuperator. The recuperator bypass passage may comprise at least one of: (i) a passage for working fluid to flow from the compression cylinder to the combustion cylinder so that less (e.g. none) of its journey is through the recuperator, and/or (ii) a passage for exhaust fluid to flow from the combustion cylinder to the exhaust so that less (e.g. none) of its journey is through the recuperator. For example, the recuperator bypass passage could be a bypass for either side of the recuperator (e.g. to bypass either the first or the second passage). The recuperator bypass passage may be arranged to enable at least some of the exhaust fluid from the combustion cylinder to avoid flowing through the recuperator.

The controller may be configured to control operation of the engine based on the indicated temperature by controlling use of the recuperator bypass passage. The controller may control temperature in the recuperator by controlling which fluid, and/or how much of that fluid, may flow through the recuperator. In the event that the indicated temperature is too high, the controller may control operation of the engine so that an average temperature of fluid flowing through the recuperator is reduced. For example, the recuperator bypass passage may be controlled so that a greater proportion of the hot exhaust fluid is diverted away from the recuperator than if the indicated temperature was lower. In the event that the indicated temperature is too low, the controller may control operation of the engine so that an average temperature of fluid flowing through the recuperator is increased. For example, the recuperator bypass passage may be controlled so that a greater proportion of the hot exhaust fluid travels through the recuperator. The same may hold for a recuperator bypass passage associated with the first passage of the recuperator, only, in the event that the fluid on this side is colder than on the other side, the control of the usage of the recuperator bypass passage may be the reverse of as described for the second passage.

The controller may be configured to control operation of the engine based on the indicated temperature by controlling at least one of: (i) opening and closing times for an inlet and/or exhaust valve of the combustion cylinder, and (ii) a timing of supplying of fuel into the combustion cylinder. For example, where the indicated temperature is lower than a threshold value, the controller may control operation so that at least one of: (i) the inlet valve opens earlier, (ii) the exhaust valve opens earlier, and (iii) fuel is supplied to the combustion cylinder earlier. For example, where the indicated temperature is greater than a threshold value, the controller may control operation so that at least one of: (i) the inlet valve opens later, (ii) the exhaust valve opens later, and (iii) fuel is supplied to the combustion cylinder later. Opening the exhaust valve earlier may enable hotter (e.g. more-recently combusted and/or less-expanded combusted) fluids to pass through to the recuperator. In turn, this may warm the recuperator, and thus working fluid travelling to the combustion cylinder, which may provide a better speed of flow of working fluid into the cylinder and warmer pre-combustion temperatures. As a consequence, more complete combustion may occur, thus driving up exhaust temperatures, and thus recuperator temperatures.

The engine may comprise an intercooler for cooling and/or compressing inlet fluid to be supplied to the compression cylinder. In so doing, liquids such as water may be condensed from the cooled fluid. The engine may comprise a fluid passageway configured to enable liquid obtained from the intercooler (e.g. the condensed liquids) to be supplied to the compression cylinder where it may be used as a coolant. Injecting coolants may reduce a temperature of the working fluid—both in the compression and combustion cylinders, which may reduce an exhaust temperature, so both sides of the recuperator may house lower temperature fluids, thus driving down temperatures in the recuperator.

The controller may be configured to control operation of the engine based on the indicated temperature by controlling operation of at least one of: (i) a compressor for compressing inlet fluid to be supplied to the compression cylinder, for example wherein the compressor is a turbocharger; (ii) an intercooler for cooling inlet fluid to be supplied to the compression cylinder; (iii) a coolant system arranged to regulate a temperature of the working fluid supplied to the combustion cylinder; (iv) an inlet valve for the combustion cylinder; (v) an exhaust valve for the combustion cylinder; (vi) fuel injection timing for the combustion cylinder; (vii) a turbine arranged to be driven by exhaust fluid flowing from the combustion cylinder to the recuperator (for example, by controlling the pitch of vanes of a variable geometry turbine); (viii) a turbine bypass passage; (ix) a recuperator bypass passage; and (x) an inlet port and/or an outlet port of the compression cylinder; (xi) a heat engine such as a thermo-electric generator and/or an Organic Rankine Cycle. Each of the above means may be used to either increase and/or decrease the temperature of the material of the recuperator.

In an aspect, there is provided a corresponding method of controlling operation of the engine based on an indication of the temperature of a material of a recuperator in a split-cycle engine. The method is for controlling a split cycle internal combustion engine comprising: (i) a compression cylinder accommodating a compression piston, (ii) a combustion cylinder accommodating a combustion piston, and (iii) a recuperator arranged to exchange heat between exhaust fluid from the combustion cylinder and working fluid being supplied from the compression cylinder to the combustion cylinder. The method comprises: obtaining an indication of a temperature of a material of the recuperator, and controlling operation of the engine based on the indicated temperature. It is to be appreciated that the optional features described above with reference to the apparatus In an aspect, there is provided a split cycle internal combustion engine comprising: (i) a compression cylinder accommodating a compression piston; (ii) a combustion cylinder accommodating a combustion piston and having an exhaust valve for exhausting exhaust fluid from the combustion cylinder; (iii) a recuperator arranged to exchange heat between the exhaust fluid from the combustion cylinder and working fluid being supplied from the compression cylinder to the combustion cylinder; and (iv) a controller configured to control operation of the exhaust valve based on an indication of at least one of: (i) a temperature associated with the recuperator, and (ii) a temperature associated with the combustion cylinder.

Embodiments of the present disclosure may enable engine temperature to be regulated by controlling opening and closing times of the exhaust valve of the combustion cylinder. For example, early opening of the exhaust valve may let out hotter gases (which have not fully expanded, and are more recently-combusted). These hotter exhaust gases may thus heat up the recuperator more, which, in turn, may provide greater heating of the working fluid being supplied to the combustion cylinder from the compression cylinder. Heating this working fluid may provide a greater speed of entry of the fluid into the combustion cylinder due to an increased pressure of the working fluid, which may provide better mixing with the fuel in the combustion cylinder. In some examples, however, the flow of working fluid may be choked and in such examples, heating the working fluid may not change the speed of entry of the fluid into the combustion cylinder. It may also provide more complete combustion if the working fluid pre-combustion in the combustion cylinder is above a temperature threshold. Such embodiments may find particular application when engine running temperatures are cold, such as during start-up of the engine.

The temperature associated with the recuperator may be a temperature of a material of the recuperator (e.g. a peak material temperature). The temperature associated with the recuperator may be a fluid temperature for at least one of the fluids passing through the recuperator. The temperature associated with the combustion cylinder may be a temperature of working fluid entering the combustion cylinder. The temperature associated with the combustion cylinder may be a temperature of the combustion in the combustion cylinder, e.g. a peak temperature of combustion in the combustion cylinder. The controller is configured to control operation of the engine so that if the indicated temperature is outside a selected range, the engine is operated so as to drive the relevant temperature in to the selected range.

Controlling operation of the exhaust valve based on the indicated temperature may comprise: in the event that the indicated temperature is below a minimum threshold value, controlling operation of the exhaust valve to open at a time in the cycle which is earlier than an opening time of the exhaust valve in the event that the indicated temperature is above the minimum threshold value. Opening the exhaust valve earlier may comprise opening the exhaust valve after the piston has travelled a shorter distance from top dead centre during its cycle. The minimum threshold value may be selected based on operating conditions of the engine, e.g. it may be a value associated with complete combustion of a threshold percentage of fuel in the combustion cylinder. The position/timing at which the exhaust valve is opened may be selected based on the indicated temperature, e.g. how early in the cycle the valve is opened is determined by the controller based on the received indication. There may be several threshold values for the indicated temperature, and the opening time may be selected based on which threshold values the indicated temperature is below.

The combustion cylinder may have an inlet valve for controlling flow of working fluid into the combustion cylinder. In the event that the controller controls the exhaust valve to open at an earlier time, the controller is configured to also control operation of the inlet valve to open at a time in the cycle which is earlier than an opening time of the inlet valve in the event that the indicated temperature is above the minimum threshold value. The inlet valve may be opened earlier by an amount corresponding to the amount by which the exhaust valve is opened earlier, e.g. it may be by the same amount.

In an aspect, there is provided a method of controlling a split cycle internal combustion engine comprising: (i) a compression cylinder accommodating a compression piston, (ii) a combustion cylinder accommodating a combustion piston and having an exhaust valve for exhausting exhaust fluid from the combustion cylinder, (iii) a recuperator arranged to exchange heat between the exhaust fluid from the combustion cylinder and working fluid being supplied from the compression cylinder to the combustion cylinder. The method comprises: obtaining an indication of at least one of: (i) a temperature associated with the recuperator, and (ii) a temperature associated with the combustion cylinder; and controlling operation of the exhaust valve based on the indicated temperature.

In an aspect, there is provided a split cycle internal combustion engine comprising: (i) a compression cylinder accommodating a compression piston; (ii) a combustion cylinder accommodating a combustion piston; (iii) a recuperator arranged to exchange heat between exhaust fluid from the combustion cylinder and working fluid being supplied from the compression cylinder to the combustion cylinder; and (iv) a recuperator bypass passage selectively operable to enable at least some fluid to avoid flowing through the recuperator.

Embodiments of the present disclosure may enable temperatures of the engine to be regulated by controlling fluid flow through the recuperator. By bringing the hotter exhaust fluids into contact with the cooler working fluid flowing to the combustion cylinder, heat may be exchanged between the two. This heat exchange may be controlled by the amount of fluid flowing through the recuperator, and so the recuperator bypass passage may enable this amount to be controlled, and thus the temperature of the engine regulated.

The engine may include a controller configured to control operation of the recuperator bypass passage based on an indication of at least one of: (i) a temperature associated with the recuperator, and (ii) a temperature associated with the combustion cylinder. The recuperator bypass passage, its operation and/or the indicated temperatures may be arranged/operate in the manner already disclosed herein.

In an aspect, there is provided a split cycle internal combustion engine comprising: (i) a compression cylinder accommodating a compression piston; (ii) a combustion cylinder accommodating a combustion piston; (iii) a recuperator arranged to exchange heat between exhaust fluid from the combustion cylinder and working fluid being supplied from the compression cylinder to the combustion cylinder; (iv) a turbine arranged to be driven by the exhaust fluid flowing from the combustion cylinder to the recuperator; and (v) a turbine bypass passage selectively operable to enable at least some of the exhaust fluid to flow to the recuperator without driving the turbine.

Embodiments of the present disclosure may enable energy to be harnessed (e.g. to drive a power generator or a compressor) by exhaust gas flowing from the combustion cylinder to the recuperator. This may enable additional energy to be harnessed by the engine. Also, the turbine may reduce the temperature of the exhaust fluid, which may reduce an amount of heat exchanged in the recuperator. In some events it may be desirable to increase/maximise the amount of heat exchanged in the recuperator, and so the turbine bypass passage may be used by exhaust fluid so that it loses less heat when travelling to the recuperator. This may enable regulation of the engine temperature based on an amount of fluid utilising the turbine bypass passage, e.g. by controlling the amount of fluid flowing through the turbine bypass passage.

The engine may include a controller configured to control operation of the turbine bypass passage based on an indication of at least one of: (i) a temperature associated with the recuperator, and (ii) a temperature associated with the combustion cylinder. The turbine, the turbine bypass passage, its operation and/or the indicated temperatures may be arranged/operate in the manner already disclosed herein.

In an aspect, there is provided a method of operating a split cycle internal combustion engine comprising: (i) a compression cylinder accommodating a compression piston; (ii) a combustion cylinder accommodating a combustion piston; (iii) a recuperator arranged to exchange heat between exhaust fluid from the combustion cylinder and working fluid being supplied from the compression cylinder to the combustion cylinder; and (iv) a recuperator bypass passage selectively operable to enable at least some fluid to avoid flowing through the recuperator. The method comprises: obtaining an indication of at least one of: (i) a temperature associated with the combustion cylinder, and (ii) a temperature associated with the recuperator; and controlling use of the bypass passage based on the indicated temperature.

In an aspect, there is provided a method of operating a split cycle internal combustion engine comprising: (i) a compression cylinder accommodating a compression piston; (ii) a combustion cylinder accommodating a combustion piston; (iii) a recuperator arranged to exchange heat between exhaust fluid from the combustion cylinder and working fluid being supplied from the compression cylinder to the combustion cylinder; (iv) a turbine arranged to be driven by the exhaust fluid flowing from the combustion cylinder to the recuperator; and (v) a turbine bypass passage selectively operable to enable at least some of the exhaust fluid to flow to the recuperator without driving the turbine. The method comprises: obtaining an indication of at least one of: (i) a temperature associated with the combustion cylinder, and (ii) a temperature associated with the recuperator; and controlling use of the bypass passage based on the indicated temperature.

In an aspect, there is provided a split cycle internal combustion engine comprising: (i) a compression cylinder accommodating a compression piston; (ii) a combustion cylinder accommodating a combustion piston; (iii) a recuperator arranged to exchange heat between exhaust fluid from the combustion cylinder and working fluid being supplied from the compression cylinder to the combustion cylinder; (iv) a turbine arranged to be driven by the exhaust fluid flowing from the combustion cylinder to the recuperator; and (v) a controller configured to control operation of the turbine based on an indication of at least one of: (i) a temperature associated with the combustion cylinder; and (ii) a temperature associated with the recuperator.

Embodiments of the present disclosure may enable energy to be harnessed (e.g. to drive a power generator or a compressor) by exhaust gas flowing from the combustion cylinder to the recuperator. This may enable additional energy to be harnessed by the engine. Also, the turbine may reduce the temperature of the exhaust fluid, which may reduce an amount of heat exchanged in the recuperator. The controller may control operation of the turbine to regulate a temperature of the engine. The turbine, its operation and/or the indicated temperatures may be arranged/operate in the manner already disclosed herein.

In an aspect, there is provided a method of controlling a split cycle internal combustion engine comprising: (i) a compression cylinder accommodating a compression piston, (ii) a combustion cylinder accommodating a combustion piston, (iii) a recuperator arranged to exchange heat between exhaust fluid from the combustion cylinder and working fluid being supplied from the compression cylinder to the combustion cylinder, and (iv) a turbine arranged to be driven by the exhaust fluid flowing from the combustion cylinder to the recuperator. The method comprises: obtaining an indication of at least one of: (i) a temperature associated with the combustion cylinder, and (ii) a temperature associated with the recuperator; and controlling operation of the turbine based on the indicated temperature.

Aspects of the present disclosure may comprise a computer program product comprising program instructions configured to program a processor to perform any method disclosed herein.

DESCRIPTION OF THE FIGURES

Some embodiments will now be described, by way of example only, with reference to the figures, in which.

In the drawings like reference numerals are used to indicate like elements.

DETAILED DESCRIPTION

Examples of the present disclosure relate to systems and methods for controlling temperatures of a split cycle internal combustion engine. Operation of the engine may be controlled based on at least one obtained indication of a temperature of the engine.

A relevant temperature of the engine may be a temperature of a material of a component of the engine, such as a recuperator in a crossover passage of the engine. The hottest part of the recuperator may, for example, be the point of entry of the exhaust working fluid entering the recuperator from the combustion cylinder. In some examples the recuperator may have a diffuser to diffuse the working fluid entering the recuperator. The diffuser may be coupled to the point at which the recuperator receives the exhaust working fluid from the combustion cylinder; i.e. the recuperator may have an exhaust working fluid inlet port and the diffuser may be coupled to this exhaust working fluid inlet port. High material temperatures reached in these components may substantially affect their lifetime. Systems and methods of the present disclosure are provided to control operation of the engine so that component temperatures may remain below a selected threshold. This should help increase longevity of the engine.

A relevant temperature of the engine may be one of a temperature associated with the recuperator and/or a temperature associated with the combustion cylinder. Systems and methods may be provided which control operation of the engine to regulate these temperatures. Operation of the engine may be impeded as a result of some temperatures of the engine being too low. For example, if a temperature of working fluid in the combustion cylinder prior to combustion is too low, this may lead to inefficient combustion. Operation of the engine may also be deleterious if some temperatures of the engine are too high. For example, if a peak temperature of combustion is too high, this may result in the output of undesirable pollutants such as $NO_x$. Operation of the engine may be controlled to provide temperatures in a range between these two zones.

Figure 1:
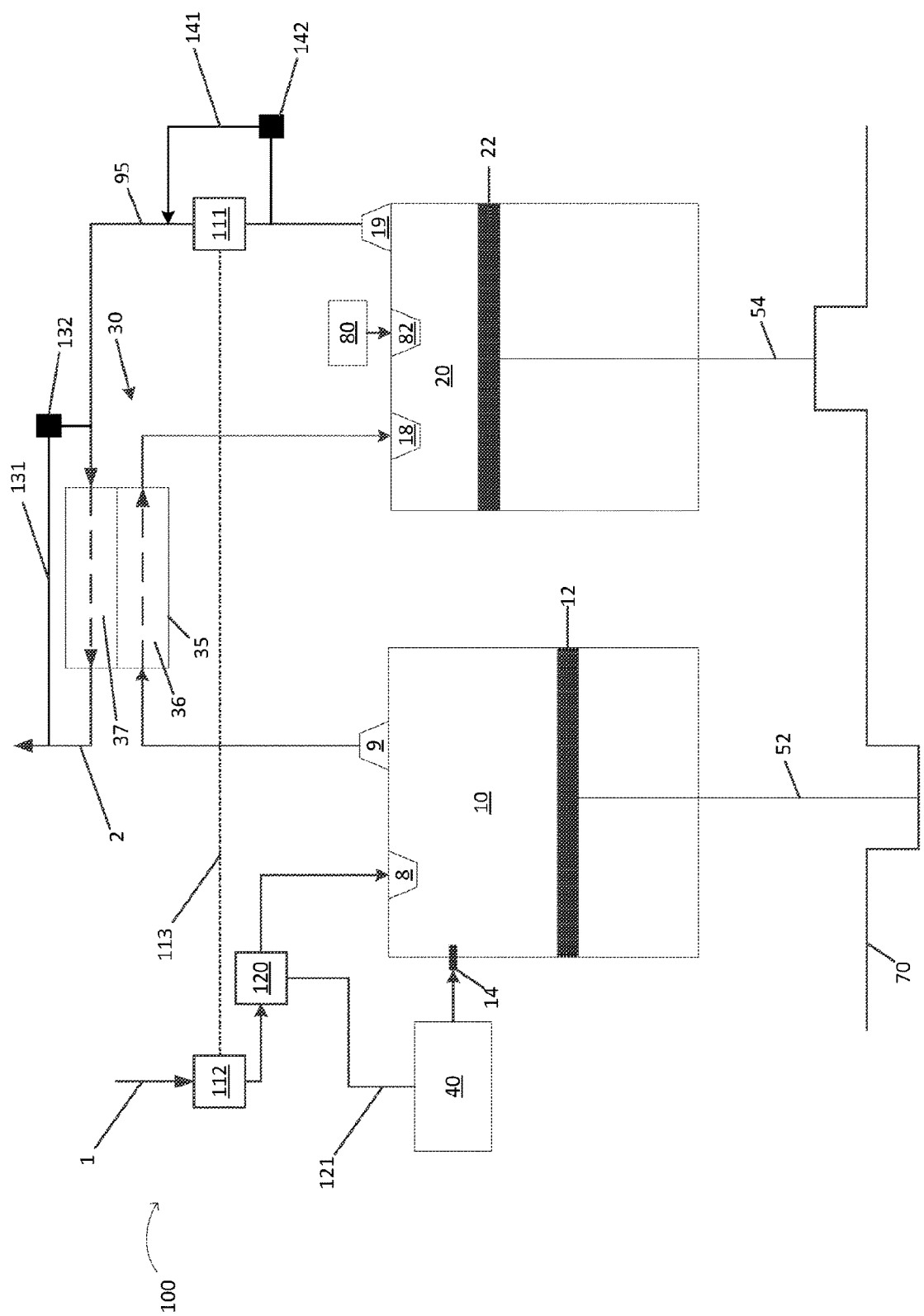
FIG. 1 shows a schematic diagram of an exemplary split cycle internal combustion engine.

FIG. 1 shows a schematic diagram of an internal combustion engine 100. Numerous different examples of systems for regulating a temperature of the engine 100 are shown in FIG. 1. It is to be appreciated that the combination shown is not to be considered limiting. Instead, the components are shown together and described as such for the sake of brevity. However, it is to be appreciated that any combination of the components used for regulating temperature is envisaged.

At a fundamental level, the engine 100 includes a compression cylinder 10 and a combustion cylinder 20. The two are connected by a crossover passage 30 which includes a heat exchanger, in the form of a recuperator 35.

The compression cylinder 10 accommodates a compression piston 12, which is coupled via a connecting rod 52 to a respective crank on a portion of a crank shaft 70. The compression cylinder 10 comprises an inlet port 8 for receiving fluid supplied to the engine 100, and an outlet port 9 coupled to the crossover passage 30. The ports may comprise valves, such as one-way valves, e.g. so that fluid which has flowed out through the outlet port 9 into the crossover passage 30 cannot flow back into the compression cylinder 10.

The crossover passage 30 provides a fluid flow path from the compression cylinder 10 to the combustion cylinder 20. The passage passes through the recuperator 35, which has two fluid passages: a first passage 36 (also referred to as the "cold-side" of the recuperator 35) and a second passage 37 (also referred to as the "hot-side" of the recuperator 35). The crossover passage 30 passes through the first passage 36. The second passage 37 is for exhaust fluid 95 from the combustion cylinder 20. The two passages of the recuperator 35 are arranged so that heat may be transferred from the second passage 37 to the first passage 36. This may enable exhaust fluid 95 from the combustion cylinder 20 to be passed through the second passage 37 and transfer heat to the compressed working fluid travelling from the compression cylinder 10 to the combustion cylinder 20, thereby warming this compressed fluid prior to combustion. The recuperator 35 may be made of a thermally resistant material, such as Inconel, to provide improved resistance to creep. The recuperator 35 may be arranged to enable the hotter parts (e.g. parts of the second passage 37) to flex, such as in response to induced heat. This may help reduce thermal stress on the recuperator 35. The recuperator 35 may store phase change materials which may store heat. It will, however, be understood that in some examples phase change materials may be placed before the recuperator 35 on the exhaust side—for example in the passage transferring working fluid between the combustion cylinder 30 and the recuperator 35. As noted above, it will also be understood that in some examples the recuperator 35 may have a diffuser to diffuse the exhaust working fluid 95 entering the recuperator 35. The diffuser may be coupled to the point at which the recuperator receives the exhaust working fluid 95 from the combustion cylinder 20; i.e. the recuperator 35 may have an exhaust working fluid inlet port and the diffuser may be coupled to this exhaust working fluid inlet port.

The combustion cylinder 20 accommodates a combustion piston 22, which is coupled via a connecting rod 54 to a respective crank on a portion of the crank shaft 70. The combustion cylinder 20 comprises an inlet valve 18, which is coupled to the crossover passage 30. The inlet valve 18 is operable to control whether or not fluid may flow from the crossover passage 30 into the combustion cylinder 20. The combustion cylinder 20 also includes an exhaust valve 19 for passing exhaust from the combustion cylinder 20 to an exhaust. The combustion cylinder 20 includes a fuel supplier, shown as fuel injector 82 for injecting fuel into the combustion cylinder 20. The fuel injector 82 is connected to a fuel reservoir 80 to provide a fluid flow path from the reservoir 80 into the combustion cylinder 20.

At a fundamental level, of operation of the engine 100 is as follows. Inlet fluid 1 (e.g. as taken from the environment) may be supplied to the compression cylinder 10 via the inlet port 8. The inlet port 8 is controlled so that a selected volume of inlet fluid 1 is provided to the compression cylinder 10. In the compression cylinder 10 this fluid is compressed by movement of the compression piston 12, before being expelled from the compression cylinder 10 to the crossover passage 30 via the outlet port 9. The fluid then flows through the first passage 36 of the recuperator 35 where it is heated by exhaust fluid 95 from the combustion cylinder 20 passing through the second passage 37. The inlet valve 18 of the combustion cylinder 20 is controlled to allow the warm compressed fluid to flow into the combustion cylinder 20. Fuel from the fuel reservoir 80 is injected into the combustion cylinder 20 via the injector 82, where it mixes with the heated working fluid supplied to the combustion cylinder 20. This mixture combusts and drives movement of the combustion piston 22 before the exhaust valve 19 is controlled to exhaust the combusted fluid from the combustion cylinder 20. This hot exhaust fluid 95 is then passed through a turbine 111 as discussed in more detail below (if present) and through the second passage 37 of the recuperator 35, where it warms fluid in the first passage 36 of the recuperator 35, before being exhausted from the engine 100 as exhausted fluid 2.

With use of the engine 100, temperatures of the engine 100 will vary. Variations in temperature may lead to a difference in performance characteristics of the engine 100. Typically, the engine 100 will start at relatively cold temperatures (e.g. with the components and the fluids at ambient temperature). This temperature will rise with use, and the engine 100 temperatures may be at their peak under part load (for example, 50% or less of maximum load) where the recuperator 35 may operate most efficiently with a lower flow of working fluid. However, in some examples the engine 100 temperatures may reach their peak under heavy use, for example at 50% or more, for example at 80% or more of maximum load.

As to monitoring temperatures, temperatures associated with the recuperator 35 and the combustion cylinder 20 may be of particular use. It may be determined that a temperature of the engine 100 is too high. If temperatures in the recuperator 35 get too high, the material of the recuperator 35 may suffer. For example, by exposing the material of the recuperator 35 to too much heat, it may undergo creep-related issues which compromise its performance and which ultimately will result in the recuperator 35 needing to be repaired or replaced. Likewise, if peak temperatures of combustion in the combustion cylinder 20 get too high, this may result in the formation of $NO_x$, which is an undesirable pollutant.

It may be determined that a temperature of the engine 100 is too low. If temperatures of the engine 100 are too low, this may inhibit optimal combustion and result in incomplete combustion of the fuel injected. This may be identified based on the temperature of the recuperator 35 and/or the temperature of the working fluid in the recuperator 35 (as a low temperature of working fluid prior to entry into the combustion cylinder 20 will result in a lower temperature in the combustion cylinder 20). It may be identified based on the temperature of combustion in the combustion cylinder 20 (as incomplete combustion will result in lower temperatures).

The engine 100 includes a controller (not shown) which is configured to monitor indications of at least one engine temperature. The engine temperature may be a temperature associated with the recuperator 35, such as a temperature of a material of the recuperator 35 and/or a temperature of working fluid in the recuperator 35 (e.g. in the first and/or second passage 37). The engine temperature may be a temperature associated with the combustion cylinder 20, such as a temperature of combustion (e.g. a peak temperature of combustion), or a temperature of working fluid in the combustion cylinder 20 (e.g. prior to combustion). Based on an obtained indication of a relevant temperature (e.g. any of these temperatures), the controller may control operation of the engine 100. For example, in the event that the obtained temperature indicates that the operational temperature of the engine 100 is below a lower threshold value (e.g. it is too cold), the controller may control operation of the engine 100 so as to raise the temperature of the engine 100. In the event that the obtained temperature indicates that the operational temperature of the engine 100 is above an upper threshold value (e.g. it is too hot), the controller may control operation of the engine 100 so as to lower the temperature of the engine 100.

The controller may determine, e.g. based on the indicated temperature, that operation of the engine 100 should be controlled to either raise/lower the temperature of the relevant component, or to continue with the current operation. In the event that the temperature is to be lowered or raised, the controller may employ operation of any of the following means accordingly (either individually or in combination with other means).

The engine 100 may include a compressor 112. The compressor 112 is arranged to receive inlet fluid 1 which is being supplied to the compression cylinder 10. The compressor 112 may be in the form of a turbocharger or a supercharger. The compressor 112 is configured to compress inlet fluid 1 prior to said inlet fluid 1 being supplied to the compression cylinder 10. The compressor 112 may provide more compressed, and thus denser, fluid. In turn, this may enable a greater mass flow through the engine 100 which may result in greater speed of fluid flow into the combustion cylinder 20 and/or greater combustion temperatures in the combustion cylinder 20. An effect of actuating the compressor 112 may therefore be to raise temperatures of the engine 100. Use of the compressor 112 may raise temperatures associated with the combustion cylinder 20 and/or the recuperator 35.

The controller may therefore increase, or initiate, operation of the compressor 112 to raise temperatures of the engine 100. For example, in response to an indication that temperatures of the engine 100 are to be raised, the controller may control operation of the compressor 112 to raise temperatures of the engine 100. Controlling operation of the compressor 112 may comprise powering on the compressor 112 to compress fluid passing through it. It may comprise controlling a proportion of fluid which is passed through the compressor 112 and/or controlling a degree of compression imparted by the compressor 112. As such, the compressor 112 may be operable between a first state in which it provides no compression of the working fluid and a second state in which it provides maximum compression of the working fluid. The compressor 112 may be operable between these two states, so as to provide a degree (e.g. a variable degree) of compression of the working fluid. The controller may decrease, or stop, operation of the compressor 112 to lower temperatures of the engine 100. Accordingly, by controlling operation of the compressor 112, the controller may regulate a temperature of the engine 100.

The engine 100 may include an intercooler 120. The intercooler 120 is arranged to receive inlet fluid 1 to be supplied to the compression cylinder 10. The intercooler 120 may be arranged to receive fluid from the compressor 112 before passing this fluid through to the combustion cylinder 20. The intercooler 120 may cool fluid to be supplied to the compression cylinder 10, e.g. as received from the compressor 112. This may be a constant pressure cooling of the fluid. The intercooler 120 may be an air-to-air intercooler or an air-to-water intercooler.

Operation of the intercooler 120 may lower a temperature of the working fluid without a (significant) drop in pressure. As a consequence, the operating temperatures of the engine 100 may be reduced as the fluid to be compressed (and then combusted) is at a lower initial temperature and so ends up at a lower final temperature. Additionally, this may result in an increased thermal mass of fluid in the recuperator 35 which will also experience slower/less substantial heat rises as a consequence of heat exchange from the exhaust fluid 95. The controller may be configured to control the extent to which the intercooler 120 acts to cool the working fluid. For example, this may comprise controlling a temperature of the cooling means, or an exposure to the cooling means of the working fluid prior to entry into the compression cylinder 10. For example, a temperature of any fluid used to cool the working fluid and/or a flow path taken by the working fluid may be controlled in response to a command signal from the controller. To increase the relevant temperature of the engine 100 the controller may control operation of the engine 100 to decrease, or stop, operation of the intercooler 120. To decrease the relevant temperature of the engine 100, the controller may control operation of the engine 100 to increase, or start, operation of the intercooler 120. Accordingly, by controlling operation of the intercooler 120, the controller may regulate a temperature of the engine 100.

The engine 100 may comprise a coolant system. The coolant system may comprise a liquid coolant reservoir 40 coupled to the compression cylinder 10 via a coolant injector 14. This arrangement defines a liquid flow path for coolant in the reservoir 40 to flow into the compression cylinder 10. The coolant may comprise any suitable fluid, such as water and/or a cryogenic fluid, such as a fluid which has been condensed into its liquid phase via a refrigeration process. The coolant system may also comprise an injector 14 for injecting coolant into the crossover passage 30, although this is not illustrated in FIG. 1. The coolant system is configured to inject coolant into the compression cylinder 10. The coolant system may be operated to regulate a temperature of working fluid in the compression cylinder 10. The coolant system may be operated to control a volume of fluid injected into the coolant system. The engine 100 may include a fluid passageway 121 connecting the intercooler 120 to the coolant system (e.g. to the coolant reservoir 40). This may enable any condensed liquid resulting from cooling of the inlet fluid 1 in the intercooler 120 to be transported into the coolant reservoir 40 from where it could be used as a coolant to be injected into the compression cylinder 10 for cooling the working fluid.

Operation of the coolant system may comprise controlling a volume of fluid injected into the compression cylinder 10. As more, or cooler, fluid is injected into the compression cylinder 10, the fluid absorbs heat as it is warmed up and evaporates, thus lowering the overall temperature in the compression cylinder 10. The controller may control operation of the engine 100 to raise engine temperatures by controlling the coolant system to inject less fluid, or warmer fluid, into the compression cylinder 10. The controller may control operation of the engine 100 to lower engine temperatures by controlling the coolant system to inject more fluid, or cooler fluid, into the compression cylinder 10. Accordingly, by controlling operation of the coolant system, the controller may regulate a temperature of the engine 100.

The inlet valve 18 of the combustion cylinder 20 may be controlled to regulate a relevant temperature of the engine 100. Once opened, working fluid may flow from the crossover passage 30 into the combustion cylinder 20. The inlet valve 18 is movable between a first and second position to control whether or not working fluid may flow into the crossover passage 30, and also how much may flow in. The inlet valve 18 may be opened and closed at selected positions during the cycle of the piston. The selected positions may be fixed, or they may be variable. They may also be selected by the controller.

Upon opening of the inlet valve 18, working fluid flows into the combustion cylinder 20. Depending on the timing of the opening, the working fluid in the combustion cylinder 20 may be subjected to further compression as the combustion piston 22 proceeds towards top dead centre. This compression will provide increased heating of the working fluid, and so may raise the relevant temperatures of the engine 100. By opening the inlet valve 18 later, the combustion time of the engine 100 will also be delayed, and so this may result in incomplete combustion and thus lower temperatures. However, if the opening of the inlet valve 18 is delayed further, the temperature may rise again due to incomplete expansion. The controller may control operation of the engine 100 to reduce the relevant temperature by controlling the inlet valve 18 for the combustion cylinder 20 to open later during the cycle of the piston. The controller may control operation of the engine 100 to increase the relevant temperature by controlling the inlet valve 18 for the combustion cylinder 20 to open earlier during the cycle of the piston. Accordingly, by controlling operation of the inlet valve 18 of the combustion cylinder 20, the controller may regulate a temperature of the engine 100.

The fuel injector 82 may be controlled to regulate the relevant temperature of the engine 100. A timing at which the fuel injector 82 injects fuel into the combustion cylinder 20 may be controlled by the controller. The controller may control a quantity of fuel injected into the combustion cylinder 20, e.g. a duration of time for which the injector 82 is injecting fuel into the combustion cylinder 20. The controller may be configured to control operation of the fuel injector 82 to regulate the relevant temperature of the engine 100.

Upon actuation, the fuel injector 82 injects fuel into the combustion cylinder 20, where it may mix with the working fluid in the combustion cylinder 20 and combust, thus driving the combustion piston 22. To raise the relevant temperature, the controller may control operation of the engine 100 so that the fuel injector 82 injects fuel into the combustion cylinder 20 at a later stage during the cycle of the piston. This may cause a later and slower combustion event, lowering the available time for expansion, and leading to less conversion of enthalpy to work upon the combustion piston 22, and more enthalpy in the exhaust resulting in higher exhaust temperature from combustion cylinder 20. To lower the relevant temperature, the controller may control operation of the engine 100 so that the fuel injector 82 injects fuel into the combustion cylinder 20 at an earlier stage during the cycle of the piston. This may cause an earlier and faster combustion event, raising the available time for expansion, and leading to more conversion of enthalpy to work upon the combustion piston 22, and less enthalpy in the exhaust resulting in lower exhaust temperature from combustion cylinder 20. Accordingly, by controlling operation of the fuel injector 82, the controller may regulate a temperature of the engine 100.

The exhaust valve 19 of the combustion cylinder 20 may be controlled to regulate the relevant temperature of the engine 100. A timing at which the exhaust valve 19 is opened may be selected to control an amount of combustion occurring in the combustion cylinder 20 and/or a temperature of exhaust fluid 95 being supplied to the recuperator 35. Upon opening of the exhaust valve 19, fluid in the combustion cylinder 20 may be exhausted towards the recuperator 35. The controller may be configured to control the time at which the exhaust valve 19 opens.

In operation, as the working fluid in the combustion cylinder 20 combusts, it expands driving the combustion piston 22 towards the bottom dead centre position. To raise the relevant temperature, the controller may control operation of the engine 100 so that the exhaust valve 19 opens earlier during the cycle of the piston. This may enable hot, recently-combusted and not-yet fully-expanded working fluid to be passed to the recuperator 35. To lower the relevant temperature, the controller may control operation of the engine 100 so that the exhaust valve 19 opens later during the cycle of the piston. This may give more time for the combusted fluid to expand in the combustion cylinder 20, thus cooling down, so that the fluid provided to the recuperator 35 is cooler. Accordingly, by controlling operation of the exhaust valve 19, the controller may regulate a temperature of the engine 100.

The engine 100 may include a turbine 111. The turbine 111 is arranged to be driven by exhaust fluid 95 from the combustion cylinder 20. The turbine 111 is arranged between the exhaust valve 19 and the recuperator 35. Exhaust fluid 95 from flowing from the combustion cylinder 20 to the recuperator 35 may drive rotation of the turbine 111. The turbine 111 may be arranged to generate work based on the moving exhaust fluid 95 driving it. For example, the turbine 111 may be coupled to the compressor 112 by a connection means 113 for transmitting rotational movement of the turbine 111 to drive compressing motion of the compressor 112. The connection means 113 may be a shaft or axle. The turbine 111 may be connected to other means such as a turbo-generator for harvesting energy from the flow of hot exhaust fluid 95. In some examples the harvested energy may be temporarily stored before then being converted into another form of energy. Additionally or alternatively, energy may be harvested from the flow of hot exhaust fluid 95 by a heat engine such as an Organic Rankine Cycle and/or a thermo-electric generator. The turbine 111 may be operable to be driven at different degrees of resistance, e.g. it may be geared and/or if a variable-geometry turbine is used the pitch of the vanes of the turbine may be adjusted. The controller may be configured to control a degree of resistance associated with the turbine 111, e.g. to control an amount of energy loss from the exhaust fluid 95 upon interaction with the turbine 111. For example, the turbine 111 may be geared and/or the proportion of the fluid flow path from the exhaust valve 19 to the recuperator 35 which is obstructed by the turbine 111 may be varied.

In operation, as the exhaust fluid 95 flows past the turbine 111 it drives movement of the turbine 111, which in turn causes a reduction in the energy (temperature) of the exhaust fluid 95. To lower the relevant temperature, the controller may control operation of the engine 100 so that the turbine 111 extracts more energy from the working fluid. For example, the controller may control operation of the turbine 111 so that a greater proportion of the exhaust fluid 95 will be required to drive the turbine 111, thus lowering the temperature of the exhaust fluid 95. To raise the relevant temperature, the controller may control operation of the engine 100 so that the turbine 111 extracts less energy from the working fluid. For example, the controller may control operation of the turbine 111 so that less of the exhaust fluid 95 is required to drive the turbine 111, thus reducing the reduction in temperature. Accordingly, by controlling operation of the turbine 111, the controller may regulate a temperature of the engine 100.

The engine 100 may include a turbine bypass passage 141. Access to the turbine bypass passage 141 for exhaust fluid 95 flowing from the combustion cylinder 20 may be regulated by a turbine bypass valve 142. Operation of the turbine bypass valve 142 may be controlled by the controller. The turbine bypass valve 142 may be operated between a first state in which no fluid may flow through the turbine bypass passage 141, and a second state in which as much fluid as is practically possible may flow through the turbine bypass passage 141. The turbine bypass valve 142 may exist in states between the first and second state, to control the amount of fluid flow through the turbine bypass passage 141. The turbine bypass passage 141 is arranged to enable at least some of the exhaust fluid 95 to avoid flowing past, and thus driving, the turbine 111. This may enable some exhaust fluid 95 to flow from the exhaust valve 19 to the recuperator 35 without driving the turbine 111.

In operation, as exhaust fluid 95 flows past, and drives, the turbine 111 it may cool down and so fluid in the recuperator 35 may be less hot. In the event that some exhaust fluid 95 instead flows through the turbine bypass passage 141, that fluid will not drive the turbine 111 and so will be warmer when it reaches the recuperator 35. To lower the relevant temperature, the controller may control operation of the engine 100 so that a greater amount of the exhaust fluid 95 flows past, and drives, the turbine 111 (e.g. a decreased amount flows through the turbine bypass passage 141). This may have the effect of increasing the reduction of energy, and thus heat, in this fluid. For example, the controller may control the turbine bypass valve 142 to effect this change. To increase the relevant temperature, the controller may control operation of the engine 100 so that a decreased amount of the exhaust fluid 95 flows past, and drives, the turbine 111 (e.g. for example, the controller may increase the relevant temperature by increasing the amount exhaust fluid 95 that flows through the turbine bypass passage 141). This may result in hotter exhaust fluid 95 being delivered to the recuperator 35, which may in turn heat up the relevant component of the engine 100. Accordingly, by controlling operation of the turbine bypass passage 141, the controller may regulate a temperature of the engine 100.

The engine 100 may include a recuperator bypass passage 131. Access to the recuperator bypass passage 131 for exhaust fluid 95 flowing from the combustion cylinder 20 may be regulated by a recuperator bypass valve 132. Operation of the recuperator bypass passage 132 may be controlled by the controller. The recuperator bypass passage 132 may be operated between a first state in which no fluid may flow through the recuperator bypass passage 131, and a second state in which as much fluid as is practically possible may flow through the recuperator bypass passage 131. The recuperator bypass passage 132 may exist in states between the first and second state, to control the amount of fluid flow through the recuperator bypass passage 131. The recuperator bypass passage 131 is arranged to enable at least some of the exhaust fluid 95 to avoid flowing through the recuperator 35 (e.g. through the second passage 37 of the recuperator 35). This may enable some exhaust fluid 95 to bypass at least some of the recuperator 35.

In operation, as exhaust fluid 95 flows through the recuperator 35 (e.g. through the second passage 37) it may exchange heat with working fluid flowing through the recuperator 35 to the combustion cylinder 20. The exhaust fluid 95 is typically warmer, and so this transfers heat to warm up the working fluid, which will have the effect of warming the relevant component of the engine 100. To lower the relevant temperature, the controller may control operation of the engine 100 so that a greater amount of the exhaust fluid 95 flows through the recuperator bypass passage 131 (e.g. a decrease in the amount of exhaust fluid 95 flowing through the recuperator 35). For example, the controller may control the recuperator bypass passage 131 to effect this change. This may have the effect of reducing the amount of heat transfer, and lowering the amount of generated heat which is retained within the engine 100. To raise the relevant temperature, the controller may control operation of the engine 100 so that a reduced amount of exhaust fluid 95 flows through the recuperator bypass passage 131 (e.g. an increased amount of exhaust fluid 95 flows through the recuperator bypass passage 131. This may result in more heat being exchanged in the recuperator 35 and thus warming of the engine 100. Accordingly, by controlling operation of the recuperator bypass passage 131, the controller may regulate a temperature of the engine 100.

The inlet and/or outlet ports of the compression cylinder 10 may also be controlled to control the temperature of the relevant component of the engine 100. It is to be appreciated that by varying opening timings for these ports, the working fluid in the compression cylinder 10 may be subject to differing amounts of compression and/or different times for heating in the recuperator 35 (including different thermal masses for heating). The controller may therefore control opening and closing of these ports to regulate a temperature of the engine 100.

Figure 2:
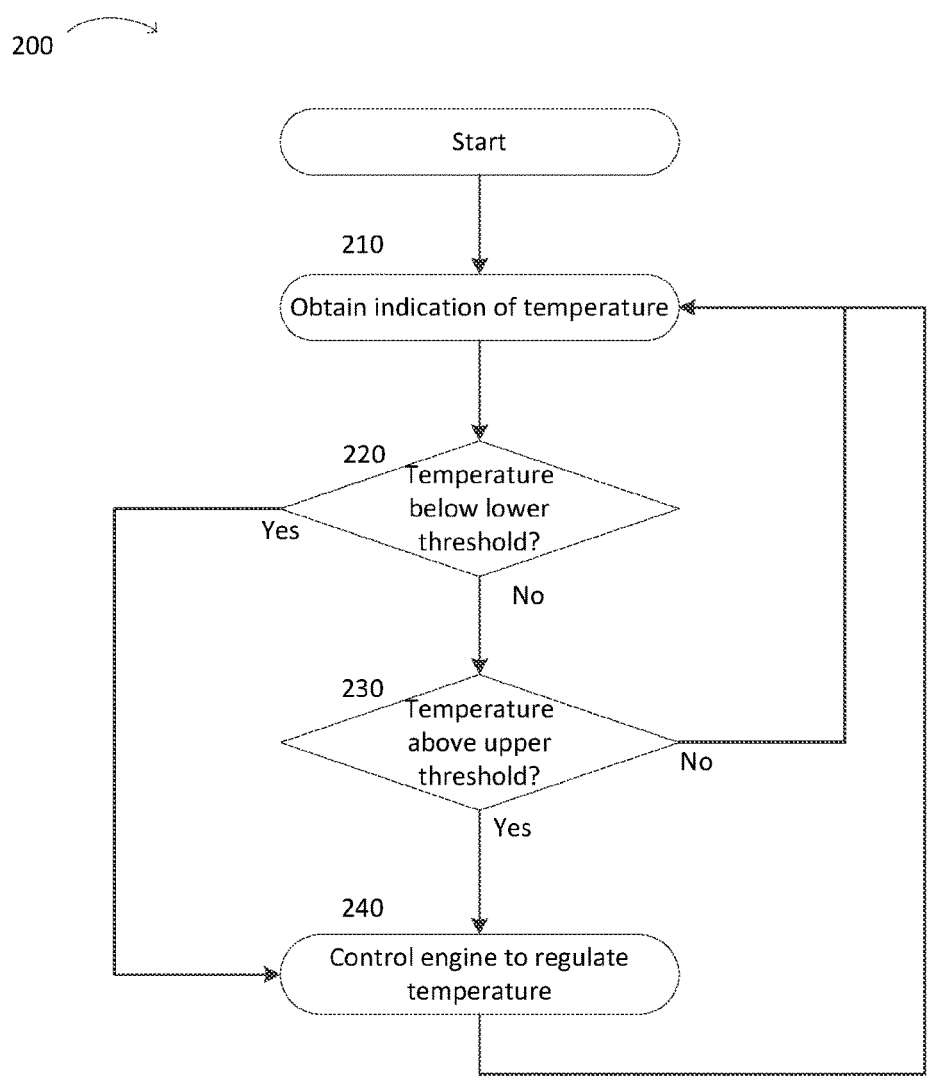
FIG. 2 shows a flow-chart illustrating an exemplary method of operation for a split cycle internal combustion engine.

A method 200 of operation of a split cycle engine, such as the one shown in FIG. 1, will now be described with reference to the flow chart of FIG. 2. It will be understood that the controller described above may be configured to perform this method 200 of operation of a split cycle engine.

At step 210, an indication of temperature is obtained. This may comprise any suitable way of obtaining an indication of temperature. For example, this may be received from a sensor for measuring temperature and/or it may be received from a sensor measuring another thermodynamic variable, but from which an indication of a temperature may be deduced. The engine 100 may comprise at least one sensor capable of providing an indication of a temperature of the relevant component of the engine 100. The engine 100 may include an arrangement of at least one sensor of the type described in GB 2565050, and the method may comprise obtaining (e.g. receiving measurements from sensors and determining temperatures therefrom) in a manner of the type described in GB 2565050. In some examples the sensor may be located on the hottest part of the recuperator 35. The peak temperature may be experienced in the recuperator 35 at the point of entry of the exhaust working fluid entering the recuperator 35 from the combustion cylinder 20. In some examples the recuperator 35 may have a diffuser to diffuse the working fluid in the recuperator 35. The diffuser may be coupled to the point at which the recuperator 35 receives the working fluid from the combustion cylinder 20; i.e. the recuperator 35 may have an exhaust working fluid inlet port and the diffuser may be coupled to this exhaust working fluid inlet port. A sensor for measuring the temperature of the recuperator 35 may be coupled to the diffuser and/or the exhaust working fluid inlet port.

The obtained temperature may be an indication of a temperature of a material of the recuperator 35 or a material of the crossover passage 30. In some examples the obtained temperature may be obtained based on at least one surface measurement of a temperature of the recuperator 35 and/or the crossover passage 30. The obtained temperature may be obtained based on at least one measurement of fluid temperatures within the recuperator 35 and/or crossover passage 30. The method 200 may comprise determining the temperature, such as determining the peak temperature, based on the measured temperature (or other suitable thermodynamic variable). For example, a mapping may be used which maps measured values to the relevant temperature. For example, a measurement of a temperature in a first location of the recuperator 35 and/or crossover passage 30 may be mapped onto an associated peak temperature of the material in the recuperator 35 and/or crossover passage 30. The method may therefore comprise obtaining an indication of the relevant temperature of the engine 100.

At step 220, the obtained indication of the temperature is compared to the lower threshold. In the event that this temperature is below the lower threshold, and thus outside a selected operating range for temperatures of the engine 100, the method proceeds to step 240. In the event that this temperature is above the lower threshold, the method proceeds to step 230 to determine whether or not the temperature is within the selected operating range for temperatures of the engine 100.

At step 230, the obtained indication of the temperature is compared to the upper threshold. In the event that the temperature is below the upper threshold, it is determined that the temperature is currently within the selected operating range for the engine 100. In this case, the method proceeds to step 210, where the method is repeated. The method may be repeated on a regular basis, e.g. every 5 seconds. The method may therefore provide a continuous feedback system for regulating the relevant temperature of the engine 100 so that it remains within a selected operating range. In the event that this temperature is above the upper threshold, and thus outside a selected operating range for temperatures of the engine 100, the method proceeds to step 240.

At step 240, operation of the engine 100 is controlled to regulate the temperature. In this step, the operation is controlled with the aim of driving the relevant temperature to within the selected operating range, which may be performed by the controller described above. If the temperature is below this range, the controller will control operation of the engine 100 with the intent of warming the engine 100 or at least a portion of the engine 100, and if the temperature is above this range, the controller will control operation of the engine 100 with the intent of cooling the engine 100 or at least a portion of the engine 100.

The controller may select a suitable means or combination of means for increasing/decreasing the temperature of the engine 100 or at least a portion of the engine 100. It is to be appreciated that the exact choice may be a selection of controlling operation of one, or multiple, components of the engine 100. This selection may be based on the components available in any given engine 100. The controller may comprise data indicative of expected changes as a result of changing operation of any given component. As such, the controller may select component(s) for controlling temperature based on this data. In some examples, certain components may have a maximum output, and temperature change may be controlled using some components preferentially up to their maximum output. For example, the coolant system may be operated up to an evaporation limit for the working fluid (e.g. to avoid need for filtering/removing condensed liquid in the engine 100).

The controller may therefore control operation of the relevant components of the engine 100 with the intent of driving the relevant temperature towards the selected range. The method then returns to step 210 for more monitoring of the relevant temperature, so as to provide a controlled feedback loop for regulating the relevant temperature of the engine 100. For controlling operation of the engine 100 when the relevant temperature is within the selected range, the controller may continue with operating the same operating conditions of the engine 100 as before, or it may still seek to improve the engine conditions based on the obtained indication of the temperature, and a selection of narrower ranges which are linked to improved operation of the engine 100 over operation within the broader temperature range.

It will be appreciated from the discussion above that the embodiments shown in the figures are merely exemplary, and include features which may be generalised, removed or replaced as described herein and as set out in the claims. With reference to the drawings in general, it will be appreciated that schematic functional block diagrams are used to indicate functionality of systems and apparatus described herein. In addition the processing functionality may also be provided by devices which are supported by an electronic device. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit.

As will be appreciated by the skilled reader in the context of the present disclosure, each of the examples described herein may be implemented in a variety of different ways. Any feature of any aspects of the disclosure may be combined with any of the other aspects of the disclosure. For example method aspects may be combined with apparatus aspects, and features described with reference to the operation of particular elements of apparatus may be provided in methods which do not use those particular types of apparatus. In addition, each of the features of each of the embodiments is intended to be separable from the features which it is described in combination with, unless it is expressly stated that some other feature is essential to its operation. Each of these separable features may of course be combined with any of the other features of the embodiment in which it is described, or with any of the other features or combination of features of any of the other embodiments described herein. Furthermore, equivalents and modifications not described above may also be employed without departing from the invention.

Certain features of the methods described herein may be implemented in hardware, and one or more functions of the apparatus may be implemented in method steps. It will also be appreciated in the context of the present disclosure that the methods described herein need not be performed in the order in which they are described, nor necessarily in the order in which they are depicted in the drawings. Accordingly, aspects of the disclosure which are described with reference to products or apparatus are also intended to be implemented as methods and vice versa. The methods described herein may be implemented in computer programs, or in hardware or in any combination thereof. Computer programs include software, middleware, firmware, and any combination thereof. Such programs may be provided as signals or network messages and may be recorded on computer readable media such as tangible computer readable media which may store the computer programs in non-transitory form. Hardware includes computers, handheld devices, programmable processors, general purpose processors, application specific integrated circuits (ASICs), field programmable gate arrays (FPGAs), and arrays of logic gates. In particular, it will be understood that the controller described above may be implemented in the form of hardware such as computers, handheld devices, programmable processors, general purpose processors, application specific integrated circuits (ASICs), field programmable gate arrays (FPGAs), and arrays of logic gates.

Other examples and variations of the disclosure will be apparent to the skilled addressee in the context of the present disclosure.

The invention claimed is:

1. A split cycle internal combustion engine comprising:
 a compression cylinder accommodating a compression piston;
 a combustion cylinder accommodating a combustion piston;
 a recuperator arranged to exchange heat between exhaust fluid from the combustion cylinder and working fluid being supplied from the compression cylinder to the combustion cylinder; and
 a recuperator bypass passage selectively operable to enable at least some fluid to avoid flowing through the recuperator.

2. The split cycle internal combustion engine of claim 1, further comprising a controller configured to control usage of the recuperator bypass passage based on an indication of at least one operating parameter of the engine.

3. The split cycle internal combustion engine of claim 2, wherein said at least one operating parameter of the engine comprises a temperature of at least one of: (i) a material of the recuperator, and (ii) the working fluid to be supplied to the combustion cylinder.

4. The split cycle internal combustion engine of claim 2, wherein in the event that the indication of the operating parameter exceeds a threshold criterion, the controller is configured to control operation of the recuperator bypass passage to reduce a temperature of the recuperator and/or a temperature of the working fluid to be supplied to the combustion cylinder.

5. The split cycle internal combustion engine of claim 4, wherein controlling operation of the recuperator bypass passage to reduce a temperature of the recuperator comprises controlling operation of the recuperator bypass passage to reduce an average temperature of the fluid flowing through the recuperator.

6. The split cycle internal combustion engine of claim 4, wherein controlling operation of the recuperator bypass passage to reduce a temperature of the recuperator comprises at least one of: (i) increasing the amount of exhaust fluid from the combustion cylinder which bypasses the recuperator, and (ii) decreasing the amount of working fluid from the compression cylinder which bypasses the recuperator.

7. The split cycle internal combustion engine of claim 4, wherein controlling operation of the recuperator bypass passage to reduce a temperature of the working fluid to be supplied to the combustion cylinder comprises at least one of: (i) increasing the amount of exhaust fluid from the combustion cylinder which bypasses the recuperator, and (ii) increasing the amount of working fluid from the compression cylinder which bypasses the recuperator.

8. The split cycle internal combustion engine of claim 2, wherein in the event that the indication of the operating parameter does not satisfy a threshold criterion, the controller is configured to control operation of the recuperator bypass passage to increase a temperature of the recuperator and/or a temperature of the working fluid to be supplied to the combustion cylinder.

9. The split cycle internal combustion engine of claim 8, wherein controlling operation of the recuperator bypass passage to increase a temperature of the recuperator comprises controlling operation of the recuperator bypass passage to increase an average temperature of the fluid flowing through the recuperator.

10. The split cycle internal combustion engine of claim 8, wherein controlling operation of the recuperator bypass passage to increase a temperature of the recuperator comprises at least one of: (i) decreasing the amount of exhaust fluid from the combustion cylinder which bypasses the recuperator, and (ii) increasing the amount of working fluid from the compression cylinder which bypasses the recuperator.

11. The split cycle internal combustion engine of claim 8, wherein controlling operation of the recuperator bypass passage to increase a temperature of the working fluid to be supplied to the combustion cylinder comprises at least one of: (i) decreasing the amount of exhaust fluid from the combustion cylinder which bypasses the recuperator, and (ii) decreasing the amount of working fluid from the compression cylinder which bypasses the recuperator.

12. The split cycle internal combustion engine of claim 2, wherein the controller is configured to control operation of the recuperator bypass passage to control an amount of heat exchange occurring in the recuperator based on the indication of at least one operating parameter of the engine.

13. The split cycle internal combustion engine of claim 2, wherein the controller is configured to control operation of the recuperator bypass passage to reduce a temperature of a material of the recuperator in the event that the indicated parameter is a temperature which exceeds an upper threshold value.

14. The split cycle internal combustion engine of claim 2, wherein the controller is configured to control operation of the recuperator bypass passage to reduce an amount of heat-induced damage inflicted on the recuperator.

15. The split cycle internal combustion engine of claim 14, wherein controlling operation of the recuperator bypass passage based on the indication of the temperature comprises: in the event that the indicated temperature exceeds an upper threshold value, controlling operation of the recuperator bypass passage to reduce a temperature of the recuperator to reduce an amount of heat-induced damage inflicted on the recuperator.

16. The split cycle internal combustion engine of claim 1, wherein the recuperator bypass passage comprises: (i) a first passage for working fluid supplied from the compression cylinder, and (ii) a second passage for exhaust fluid from the combustion cylinder; and wherein the recuperator bypass passage comprises: a compressed fluid bypass passage for the working fluid supplied from the compression cylinder to bypass the first passage, and/or an exhaust fluid bypass passage for the exhaust fluid from the combustion cylinder to bypass the second passage.

17. The split cycle internal combustion engine of claim 1, wherein the recuperator bypass passage is arranged to enable recuperator bypass on both sides of the recuperator.

18. The split cycle internal combustion engine of claim 2, wherein the controller is configured to control opening and/or closing times of an exhaust valve of the combustion cylinder based on the obtained indication.

19. A split cycle internal combustion engine comprising:
a compression cylinder accommodating a compression piston;
a combustion cylinder accommodating a combustion piston;
a recuperator arranged to exchange heat between exhaust fluid from the combustion cylinder and working fluid being supplied from the compression cylinder to the combustion cylinder;
a turbine arranged to be driven by the exhaust fluid flowing from the combustion cylinder to the recuperator; and
a turbine bypass passage selectively operable to enable at least some of the exhaust fluid to flow to the recuperator without driving the turbine.

20. A method of operating a split cycle internal combustion engine, the split cycle internal combustion engine comprising:
a compression cylinder accommodating a compression piston;
a combustion cylinder accommodating a combustion piston;
a recuperator arranged to exchange heat between exhaust fluid from the combustion cylinder and working fluid being supplied from the compression cylinder to the combustion cylinder; and a recuperator bypass passage selectively operable to enable at least some fluid to avoid flowing through the recuperator;

wherein the method comprises:
- obtaining an indication of at least one of: (i) a temperature associated with the combustion cylinder, and (ii) a temperature associated with the recuperator; and
- controlling use of the recuperator bypass passage based on the indicated temperature.

* * * * *